H. W. LIBBEY.
Velocipede.

No. 88,492.  Patented March 30, 1869.

Witnesses
J. H. Burridge
E. E. Waite

Inventor
H. W. Libbey, M.D.

H. W. LIBBEY, OF CLEVELAND, OHIO.

Letters Patent No. 88,492, dated March 30, 1869.

IMPROVEMENT IN VELOCIPEDES.

The Schedule referred to in these Letters Patent and making part of the same.

*To all whom it may concern:*

Be it known that I, H. W. LIBBEY, M. D., of Cleveland, in the county of Cuyahoga, and State of Ohio, have invented certain new and useful Improvements in Velocipedes; and I do hereby declare that the following is a full and complete description of the same, reference being had to the accompanying drawing, making a part of this specification, in which—

Figure 1:
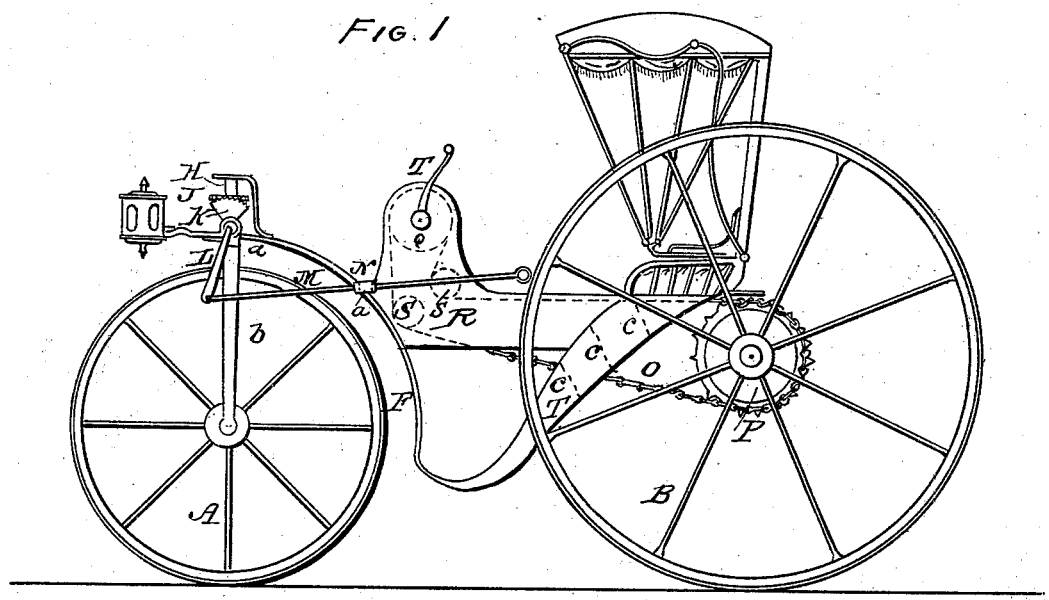

Figure 1 is a side view of the velocipede.

Figure 2:
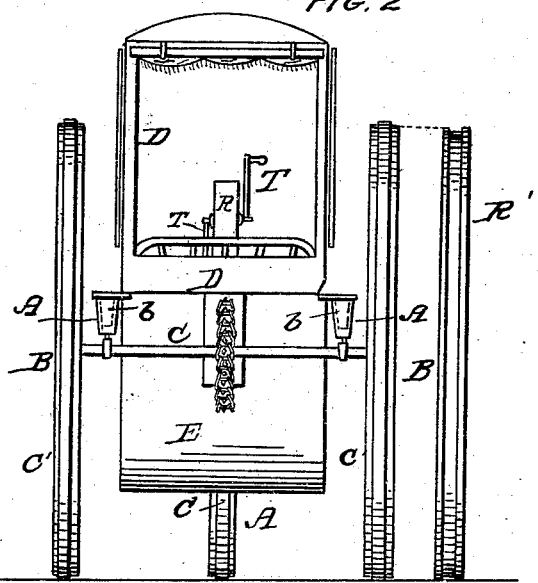

Figure 2, a view of the rear end.

Figure 3:
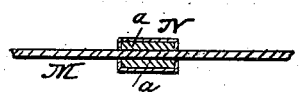

Figure 3, a detached section.

Like letters of reference refer to like parts in the different views.

The nature of this invention relates to a tricycle-velocipede, propelled by means of an endless chain passing over appropriate wheels, the same being operated by a crank; also being so constructed, that two persons can ride therein, and guide the vehicle by an arrangement attached to and actuating the front wheel, as will herein be shown.

In fig. 1, A B represent the wheels of the vehicle, of which A is the front wheel, and B, the hind ones, more fully shown in fig. 2, and which are rigidly secured to the shaft, or axle-tree C.

Upon said wheels is mounted the body of the vehicle, consisting of the covered seat D, which is so arranged that it can be adjusted backward or forward, for a purpose hereinafter shown.

E is the stirrup, or boot-section of the body, in which the feet of those riding rest.

F is a reach, whereby the hind wheels are connected to the front one. Said reach extends upward and partially around the front wheel, and connected thereto by the intervention of the bifurcated standard G, the lower end of which is secured to the axle of the wheel, whereas the upper end terminates in a short upright shaft, H. Said shaft passes through the end of the reach, and is secured at the extreme end of the stay I, in which it is pivoted.

The end of the reach rests upon a broad flat shoulder, or disk, *a*, attached to the upper end of the standard at the base of the shaft, and forms a circle for the security of the connection, and turning of the wheel for guiding the vehicle.

The guiding-apparatus consists of the segmental gear J K, one of which, J, is connected to the shaft H, whereas segment K is secured to the crank L, and in such relation therewith, as to engage with segment J, as shown.

M is a rod for operating the gears, one end of which, as will be seen, is attached to the crank, whereas the other reaches back to within convenient reach of those riding.

N is a rest for holding the rod in proper position. Said rest is provided with a rubber lining, *a*, fig. 3, through which the rod passes, and whereby it is tightly held, and thus prevented from moving too freely, by the action of the wheel, thereby dispensing with the use of a ratchet and wheel for holding the rod.

The device for propelling this vehicle, consists of an endless chain, O, passing over the toothed wheel P, keyed to the axle-tree C; also passing over a similar wheel, indicated by the dotted line Q, enclosed in the case R, which also encloses a section of the chain, and the guide and tension-rollers S.

The wheel Q is provided with cranks T, whereby the power is applied for driving the velocipede.

In the blocks A′, fig. 2, whereby the body of the carriage is supported on the axle-tree, is a rubber or metallic spring, indicated by the dotted lines *b*, thereby obtaining to the body, in its relation with the wheels, an elastic connection, securing to the rider, by this means, an easy motion of the vehicle.

The dotted lines *c*, fig. 1, indicate pockets, arranged within the boot E, for the storage of bundles, &c.

B′ is a head-light.

In the periphery of each wheel is sunk a groove, U, in which is fitted a rubber band, or tire, C′, whereby greater adhesion is given to the wheels upon the ground, thereby preventing them from slipping, also causing the velocipede to run with less noise and jarring over rough or uneven ground. The rubber tire being secured in a groove, it is thereby prevented from lateral expansion, and will therefore wear much longer, and with less liability to come off.

Having thus described the construction and arrangement of the vehicle, the practical operation of the same is as follows, viz:

One or more persons take their places in the seat D, within easy reach of the cranks, the seat being adjusted, according to the size of the persons, near to or distant therefrom, as convenience may require.

Now, on turning the cranks, motion is given to the wheels and chain, thereby actuating the hind wheels, and propelling forward the vehicle, the same being guided by means of the rod M actuating the segments, thereby causing the wheel to turn in either direction that the rider may wish to go.

By this arrangement for steering the velocipede, little exertion is required, as the wheel immediately obeys the actuating-gears, and which being placed so as to be operated by one hand, leaves the other free for operating the crank.

The propulsion of this vehicle is easily performed, as the whole structure is light, and is therefore moved without great exertion on the part of the riders.

It is neat, strong, and durable, of easy access and convenience.

I am aware that the devices described in the foregoing, separately considered, are not new, they having been long in use, and I do not claim any of them separately; but

What I claim as my improvement, and desire to secure by Letters Patent, is—

1. The combination of rubber-lined rest in N, with rod M, segmental gear J, chain O, crank and crank-shaft, wheels Q P, rollers S, and wheels B, the whole forming the running gear and steering-apparatus of a velocipede, substantially as described.

2. The rubber-lined rest N, in combination with the rod M, for the purpose set forth.

H. W. LIBBEY, M. D.

Witnesses:
J. H. BURRIDGE,
E. E. WAITE.